United States Patent
Sikora et al.

(10) Patent No.: US 10,710,132 B2
(45) Date of Patent: Jul. 14, 2020

(54) MANUFACTURE OF SEMI-FINISHED PRODUCTS AND STRUCTURAL COMPONENTS WITH LOCALLY DIFFERENT MATERIAL THICKNESSES

(71) Applicants: THYSSENKRUPP STEEL EUROPE AG, Duisburg (DE); thyssenkrupp AG, Essen (DE)

(72) Inventors: Sascha Sikora, Lünen (DE); Stefan Myslowicki, Mönchengladbach (DE); Jens-Ulrik Becker, Duisburg (DE)

(73) Assignees: THYSSENKRUPP STEEL EUROPE AG, Duisburg (DE); THYSSENKRUPP AG, Essen (DE)

( * ) Notice: Subject to any disclaimer, the term of this patent is extended or adjusted under 35 U.S.C. 154(b) by 197 days.

(21) Appl. No.: 15/763,886

(22) PCT Filed: Sep. 14, 2016

(86) PCT No.: PCT/EP2016/071629
§ 371 (c)(1),
(2) Date: Mar. 28, 2018

(87) PCT Pub. No.: WO2017/055083
PCT Pub. Date: Apr. 6, 2017

(65) Prior Publication Data
US 2018/0272399 A1    Sep. 27, 2018

(30) Foreign Application Priority Data
Sep. 30, 2015  (DE) .................. 10 2015 116 619

(51) Int. Cl.
*B21B 3/02*      (2006.01)
*B21B 37/24*     (2006.01)
(Continued)

(52) U.S. Cl.
CPC .............. *B21B 37/24* (2013.01); *B21B 3/02* (2013.01); *B32B 7/02* (2013.01); *B32B 15/01* (2013.01);
(Continued)

(58) Field of Classification Search
None
See application file for complete search history.

(56) References Cited

U.S. PATENT DOCUMENTS 2,438,759 A  3/1948  Liebowitz
2,562,467 A  7/1951  United States Steel NAME
(Continued)

FOREIGN PATENT DOCUMENTS

AT        372113 B      9/1983
CN     103611727 A      3/2014
(Continued)

OTHER PUBLICATIONS

English Translation of International Search Report issued in PCT/EP2016/071629, dated Dec. 21, 2016 (mailed Jan. 9, 2017).
(Continued)

*Primary Examiner* — Daniel J. Schleis
(74) *Attorney, Agent, or Firm* — The Webb Law Firm (57) ABSTRACT

A method for producing a semifinished product with locally different material thicknesses may involve preparing a multilayer, metal material composite, which has a plurality of layers with different ductilities, and rolling the material composite in a method for flexible rolling through a rolling gap formed between two rollers. The rolling gap may be configured such that regions with different material thicknesses are formed. In some cases, the multilayer, metal material composite is rolled at room temperature. Further, the plurality of layers of the multilayer, metal material composite may include a first outer layer disposed on a first (Continued)

side of a middle layer and a second outer layer disposed on a second side of the middle layer, with the second side of the middle layer being opposite the first side.

19 Claims, 5 Drawing Sheets

(51) Int. Cl.

| | | |
|---|---|---|
| B32B 15/01 | (2006.01) | |
| B32B 15/18 | (2006.01) | |
| C21D 1/673 | (2006.01) | |
| C22C 21/02 | (2006.01) | |
| C22C 38/28 | (2006.01) | |
| C22C 38/32 | (2006.01) | |
| B32B 7/02 | (2019.01) | |
| C22C 38/00 | (2006.01) | |
| C22C 38/02 | (2006.01) | |
| C22C 38/04 | (2006.01) | |
| C22C 38/06 | (2006.01) | |
| C22C 38/42 | (2006.01) | |
| C22C 38/44 | (2006.01) | |
| C22C 38/46 | (2006.01) | |
| C22C 38/48 | (2006.01) | |
| C22C 38/50 | (2006.01) | |
| C22C 38/52 | (2006.01) | |
| C22C 38/54 | (2006.01) | |

(52) U.S. Cl.
CPC .......... *B32B 15/011* (2013.01); *B32B 15/012* (2013.01); *B32B 15/18* (2013.01); *C21D 1/673* (2013.01); *C22C 21/02* (2013.01); *C22C 38/001* (2013.01); *C22C 38/004* (2013.01); *C22C 38/008* (2013.01); *C22C 38/02* (2013.01); *C22C 38/04* (2013.01); *C22C 38/06* (2013.01); *C22C 38/28* (2013.01); *C22C 38/32* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *B21B 2205/02* (2013.01); *B21B 2261/043* (2013.01); *B21B 2261/22* (2013.01)

(56) References Cited

U.S. PATENT DOCUMENTS

| | | | |
|---|---|---|---|
| 4,645,720 A | 2/1987 | Pircher et al. | NAME |
| 5,213,905 A | 5/1993 | Leger et al. | NAME |
| 5,418,074 A | 5/1995 | Grell | NAME |
| 10,272,644 B2 * | 4/2019 | Becker | B32B 15/011 |
| 2011/0111252 A1 | 5/2011 | Becker | |
| 2012/0279868 A1 | 11/2012 | Gerdenitsch et al. | |
| 2015/0231684 A1 | 8/2015 | Flöth | |
| 2015/0367597 A1 * | 12/2015 | Hilfrich | B21D 35/006 428/600 |

FOREIGN PATENT DOCUMENTS

| | | |
|---|---|---|
| DE | 1023782 B | 2/1958 |
| DE | 2142360 A1 | 4/1972 |
| DE | 2921854 C1 | 11/1990 |
| DE | 69203139 T2 | 10/1995 |
| DE | 19857156 A1 | 6/2000 |
| DE | 19921961 C1 | 2/2001 |
| DE | 19961948 A1 | 6/2001 |
| DE | 10246164 A | 4/2004 |
| DE | 102004023886 A1 | 12/2005 |
| DE | 102005006606 B3 | 3/2006 |
| DE | 102004054795 A | 5/2006 |
| DE | 102009051673 B3 | 4/2011 |
| DE | 102013108265 A | 2/2015 |
| DE | 102014008718 B | 2/2015 |
| EP | 0247020 A1 | 11/1987 |
| EP | 0731332 A2 | 9/1996 |
| EP | 1181991 A | 2/2002 |
| EP | 2123447 A1 | 11/2009 |
| EP | 2228459 A | 9/2010 |
| EP | 2886332 A | 6/2015 |
| GB | 1444063 A | 7/1976 |
| JP | H03-56 644 A | 3/1991 |
| JP | H04-32 538 A | 2/1992 |
| JP | H0693370 A | 4/1994 |
| WO | 2012146384 A | 11/2012 |
| WO | 2015090608 A1 | 6/2015 |

OTHER PUBLICATIONS

DIN EN ISO 6892-1 [[In process of locating copy]].
SEP 1220 [[In process of locating copy]].
DIN EN ISO 642 [[In process of locating copy]].
New Technology in Iron and Steel Productions, Metallurgical Industry Press, Sep. 1993, p. 132, edited by Liang Aisheng.
SEP 1220, Testing and Documentation Guideline for the Joinability of thin sheet of steel—Part 1: General Specifications, Verlag Stahleisen GmBH, Aug. 2011.
ISO 642, Steel-Hardenability test by end quenching (Jominy test), Second edition, Sep. 1, 1999.
ISO 6892-1, Metallic materials—Tensile testing—Part 1: Method of test at room temperature, First edition, Aug. 15, 2009.
English language machine translation for AT 372113 B listed above.
English language machine translation for DE 1023782 B listed above.
English language Abstract for DE 2142360 A1 listed above.
English language machine translation for DE 2921854 C1 listed above.
English language Abstract for DE 19857156 A1 listed above.
English language Abstract for DE 19921961 C1 listed above.
English language Abstract for DE 19961948 A1 listed above.
English language Abstract for DE 69203139 T2 listed above.
English language Abstract for DE 102005006606 B3 listed above.
English language Abstract for EP 0247020 A1 listed above.
English language Abstract for EP 2123447 A1 listed above.
English language Abstract for JPH0693370 A listed above.

\* cited by examiner

|    | A1     | A2     | B1    | B2    |
|----|--------|--------|-------|-------|
| C  | 0.227  | 0.35   | 0.065 | 0.015 |
| Si | 0.22   | 0.25   | 0.12  | 0.007 |
| Mn | 1.22   | 1.30   | 0.77  | 0.26  |
| P  | 0.016  | 0.01   | 0.019 | 0.008 |
| S  | 0.001  | 0.002  | 0.006 | 0.004 |
| Al | 0.033  | 0.035  | 0.037 | 0.038 |
| N  | 0.0042 | 0.005  | 0.003 | 0.002 |
| Cu | 0.01   | 0.03   | 0.045 | 0.012 |
| Cr | 0.11   | 0.14   | 0.046 | 0.03  |
| Ni | 0.013  | 0.01   | 0.035 | 0.017 |
| V  | 0.002  | 0.003  | 0.005 | 0.007 |
| Mo | 0.007  | 0.02   | 0.004 | 0.003 |
| Ti | 0.027  | 0.032  | 0.002 | 0.15  |
| Nb | 0.001  | 0.001  | 0.025 | 0.004 |
| B  | 0.0018 | 0.0027 | 0     | 0     |
| Ca | 0      | 0.0030 | 0     | 0     |

Fig. 11

MANUFACTURE OF SEMI-FINISHED PRODUCTS AND STRUCTURAL COMPONENTS WITH LOCALLY DIFFERENT MATERIAL THICKNESSES

CROSS REFERENCE TO RELATED APPLICATIONS

This application is a U.S. National Stage Entry of International Patent Application Serial Number PCT/EP2016/071629, filed Sep. 14, 2016, which claims priority to German Patent Application No. DE 10 2015 116 619.4, filed Sep. 30, 2015, the entire contents of both of which are incorporated herein by reference.

FIELD

The present disclosure generally relates to methods for producing semifinished products with locally different material thicknesses.

BACKGROUND

Structural components are used in vehicle construction and can be configured for example as bumper crossmembers, side impact beams or pillars. The structural components comprise regions with different material thicknesses, wherein regions with a greater material thickness have increased flexural rigidity and regions with a lower material thickness have lower flexural rigidity. As a result of the targeted provision of regions with a lower material thickness at locations at which high flexural rigidity is not required, the weight of the structural components can be reduced.

DE 102 46 164 A1 discloses a method for producing such a structural component with regions with different material thicknesses. In said method, a metal strip is formed by means of a method for flexible rolling. In that case, the metal strip is rolled in a rolling gap between two rollers. The rolling gap is modified during rolling such that a semifinished product with regions with different material thicknesses is obtained. Shaped blanks are cut out of the semifinished product and are formed into a structural component in a subsequent hot forming process.

During rolling, the material of the metal strip hardens with the result that the formability of the metal strip worsens. As a result, the maximum differences in material thickness that are producible by flexible rolling are limited by the hardening of the material. As a result, limits are also placed on the reduction in the component weight.

Thus a need exists to produce structural components with high strength and a reduced weight.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure relates generally to methods for producing semifinished products with locally different material thicknesses. Furthermore, the present disclosure generally relates to methods for producing structural components with locally different material thicknesses.

In some examples, a method for producing a semifinished product with locally different material thicknesses, wherein a multilayer metal material composite is prepared with a plurality of layers with different ductilities and hardening behaviors. The material composite is rolled in a method for flexible rolling through a rolling gap formed between two rollers which is modified such that regions with different thicknesses are formed.

The multilayer, metal material composite comprises a layer structure with a plurality of metal layers which have different ductilities such that the hardening behavior of the layers differs. As a result, a material composite can be prepared which has a less strongly pronounced hardening behavior overall compared with a monolithic hot-forming steel. In the flexible rolling of the material composite, regions with different material thicknesses are produced by the rolling gap being modified while the material composite is guided through the rollers. The relative ratio of the thicknesses of the individual layers of the material composite is retained during the flexible rolling. Therefore, thicker regions and thinner regions of the material composite can be produced which have an identical relative layer thickness distribution. It has been found that, in the rolling of the material composite having a plurality of layers with different ductilities, a greater rolling reduction in thickness can be achieved. This is attributable to the smaller degree of hardening of the more ductile layer of layers of the material composite. After hot forming of the flexibly rolled material composite, values of tensile strength, yield strength and bending angle can be determined at comparable levels both in the thinner regions and in the thicker regions. Therefore, in flexible rolling, greater differences in thickness can be set, and so the weight of the structural components can be reduced further.

The ductility and thus the hardening behavior of the individual layers of the material composite can be determined for example using flow curves of the materials of the individual layers. In a flow curve, the flow stress kf is plotted over the degree of forming phi. Such flow curves can be determined with a strain rate of for example 0.004 1/s in the tensile test to DIN EN ISO 6892-1 or to SEP 1220. In general, such materials, which have a lower flow stress at a given degree of forming, have higher ductility and thus less hardening by deformation. With regard to the material composite according to the invention, this means that the layers of the material composite preferably have different flow stresses kf (to SEP 1220 with a strain rate of for example 0.004 1/s) for example in a range from 0.05 to 0.15, advantageously in a range from 0.05 to 0.1, in a given range of the degree of forming phi. Alternatively or additionally, in order to determine the ductility, the elongation at break can be used. The elongation at break specifies the elongation of a sample after breaking in the tensile test compared with its initial length.

The layers of the material composite are preferably layers made of a steel material. Particularly preferably, the layers are formed from different steel materials or different steel alloys.

The material composite is preferably prepared as a strand-form, in particular strip-form, material composite. Particularly preferably, the material composite is able to be wound. During flexible rolling, regions with different material thicknesses that are adjacent in a longitudinal direction of the material composite can be formed in the strand-form, in particular strip-form, material composite.

According to one preferred embodiment, the method for flexible rolling is carried out at room temperature such that the material composite is rolled at room temperature. Therefore, it is not necessary to heat up the material composite and so no energy for heating the material composite has to be applied. The method step of flexible rolling can replace a cold rolling step in a conventional manufacturing method.

According to an alternative preferred configuration, the method for flexible rolling is carried out above the austenitizing temperature of the layers of the material composite. In this regard, the material composite is rolled at a temperature above the austenitizing temperature of the layers of the material composite, in particular at a temperature in the range from 700° C. to 1300° C., preferably in the range from 880° C. to 920° C., particularly preferably at 900° C.

A configuration in which the material composite comprises a middle layer, wherein a first outer layer is arranged on a first side of the middle layer and a second outer layer is arranged on a second side of the middle layer on the opposite side from the first side, is advantageous. The material composite can comprise a layer structure of at least three layers.

It is preferred when the coating is arranged on an opposite side of the outer layer from the middle layer. It is possible for a coating to be arranged on the first outer layer and for no coating to be arranged on the second outer layer. Alternatively, a coating can be arranged on both outer layers, such that a material composite that is coated on two sides is prepared. As a result of the coating, the surface of the material composite can be protected from undesired damage, for example by corrosion. The coating can exhibit zinc. For example, the coating can be applied by hot-dip galvanizing or electrolytic galvanizing. Alternatively, the coating can be an aluminum-based coating, for example an aluminum-silicon coating.

According to one advantageous configuration, the material composite comprises a symmetrical layer structure with respect to the middle layer. For example, the material composite can comprise a middle layer and a first outer layer and a second outer layer, wherein the outer layers are formed from an identical material and have an identical thickness. As a result, the material composite does not have a preferred direction with respect to the material properties. During forming, in particular during flexible rolling, the material composite can behave like a monolithic material. Thus, the material composite can be processed in conventional apparatuses which are suitable for monolithic materials.

In this connection, it has proven particularly advantageous when the outer layers have higher ductility than the middle layer. As a result of the outer layers being more ductile compared with the middle layer, the risk of surface defects, for example surface cracks, arising can be reduced. The flow stress of the material of the outer layers is preferably in a range less than 550 MPa at a degree of forming in the range from 0 to 0.15, preferably in a range less than 500 MPa at a degree of forming in the range from 0 to 0.1. The flow stress of the material in the middle layer is preferably greater than the flow stress of the material of the outer layers. For example, the material of the middle layer can have a flow stress greater than 500 MPa at a degree of forming of 0.05 to 0.15. The abovementioned flow stresses are determined at a strain rate of for example 0.004 1/s to SEP 1220.

It is preferred when the outer layers have a lower hardening capacity than the middle layer, such that the outer layers have a lower strength than the middle layer even after heat treatment of the material composite, or of the semifinished product produced from the material composite. The hardening capacity is understood to mean the maximum achievable hardness of the material at the surface, which can be determined for example in the end quench test to DIN EN ISO 642.

It is advantageous when the outer layers comprise a ferritic or ferritic-pearlitic material structure before hot forming, in particular before flexible rolling above the austenitizing temperature of the layers of the material composite. Layers with a ferritic material structure have, with an identical degree of forming, a lower tendency to display surface cracks during cold forming, for example during cold rolling. The middle layer comprises preferably a ferritic-pearlitic, bainitic or martensitic material structure, such that increased strength of the entire material composite can be set. Particularly preferably, the transition between the material structure of the outer layers and the material structure of the middle layer is smooth.

According to one advantageous configuration, the middle layer and the outer layers of the material composite are made from a carbon-containing steel, wherein the carbon content in the outer layers is lower than in the middle layer. Via the carbon content, the strength and ductility of each particular layer can be set individually. It is advantageous when the steel which is used to form the middle layer has a carbon content of greater than or equal to 0.2 percent by weight, preferably greater than 0.22 percent by weight, particularly preferably greater than 0.33 percent by weight, and the steels which are used to form the outer layers have a carbon content of less than 0.2 percent by weight, preferably less than 0.1 percent by weight, particularly preferably less than 0.02 percent by weight. For example, the steel used to form the middle layer can have a carbon content in the range from 0.20 to 0.27 percent by weight or a carbon content in the range from 0.3 to 0.5 percent by weight. The steels used to produce the outer layers can have for example a carbon content in the range from 0.01 to 0.06 or a carbon content in the range from 0.055 to 0.085 percent by weight.

According to one advantageous configuration, the middle layer and the outer layers of the material composite are made from a manganese-containing steel, wherein the manganese content in the outer layers is lower than in the middle layer. Via the manganese content, the strength and ductility of each particular layer can be set individually. It is advantageous when the steel which is used to form the middle layer has a manganese content of greater than 0.9 percent by weight, preferably greater than 1.0 percent by weight, particularly preferably greater than 1.2 percent by weight, and the steels which are used to form the outer layers have a manganese content of less than 0.9 percent by weight, preferably less than 0.70 percent by weight, particularly preferably less than 0.35 percent by weight. For example, the steel used to form the middle layer can have a manganese content in the range from 1.10 to 1.40 percent by weight or a manganese content in the range from 1.10 to 1.50 percent by weight. The steels used to produce the outer layers can have a manganese content in the range from 0.02 to 0.35 or a manganese content in the range from 0.70 to 0.90 percent by weight.

According to one advantageous configuration, the middle layer and the outer layers of the material composite are made from a silicon-containing steel, wherein the silicon content in the outer layers is lower than or equal to the silicon content in the middle layer. Via the silicon content, the strength of each particular layer can be set individually. It is advantageous when the steel which is used to form the middle layer has a silicon content of greater than 0.1 percent by weight, preferably greater than 0.15 percent by weight, particularly preferably greater than 0.2 percent by weight, and the steels which are used to form the outer layers have a silicon content of less than 0.25 percent by weight, preferably less than 0.1 percent by weight, particularly preferably less than 0.05 percent by weight. For example, the steel used to form the middle layer can have a silicon content in the range from 0.15 to 0.35 percent by weight or a silicon content in the range from 0.10 to 0.35 percent by weight. The steels used to produce the outer layers can have a silicon content in the range from 0.12 to 0.25 or a silicon content of less than 0.10 percent by weight.

According to one advantageous configuration, the middle layer and the outer layers of the material composite are made from a chromium-containing steel, wherein the chromium content in the outer layers is lower than or equal to the chromium content in the middle layer. Via the chromium content, the strength of each particular layer can be set individually. It is advantageous when the steel which is used to form the middle layer has a chromium content of greater than or equal to 0.05 percent by weight, preferably greater than 0.1 percent by weight, particularly preferably greater than 0.15 percent by weight, and the steels which are used to form the outer layers have a chromium content of less than or equal to 0.20 percent by weight, preferably less than or equal to 0.1 percent by weight, particularly preferably less than or equal to 0.05 percent by weight. For example, the steel used to form the middle layer can have a chromium content in the range from 0.05 to 0.25 percent by weight or a chromium content in the range from 0.05 to 0.45 percent by weight. The steels used to produce the outer layers can have a chromium content of less than or equal to 0.20 percent by weight or a chromium content of less than or equal to 0.10 percent by weight.

According to one advantageous configuration, the middle layer and the outer layers of the material composite are made from a carbon- and/or manganese- and/or silicon- and/or chromium-containing steel, wherein the sum of the carbon content and of the manganese content and of the silicon content and of the chromium content in the outer layers is lower than the sum of the carbon content and of the manganese content and of the silicon content and of the chromium content in the middle layer. It is advantageous when the steel which is used to form the middle layer has a sum of the carbon content and of the manganese content and of the silicon content and of the chromium content which is in the range from 1.5 to 2.8 percent by weight, and the steels which are used to form the outer layers have a sum of the content of carbon and manganese and silicon and chromium which is in the range from 0.03 to 1.4 percent by weight.

In a preferred configuration, the thickness of the outer layers is in the range of 5%-40% of the total thickness of the material composite, preferably in the range of 10% to 25% of the total thickness of the material composite, particularly preferably in the range of 10% to 20% of the total thickness of the material composite.

It has furthermore proven advantageous when the material composite is prepared by roll cladding. A method for producing a structural component with locally different material thicknesses, wherein a semifinished product is prepared by a method according to an above-described method, wherein the semifinished product is formed in the hot state in order to obtain a structural component, also contributes towards solving the object mentioned at the beginning.

With this method, the same advantages can be achieved as have already been described in connection with the method for producing a semifinished product with locally different material thicknesses.

Preferably, the outer layers of the structural component obtained from the semifinished product by hot forming have an elongation at break Aso, i.e. an elongation at break in the case of a sample with a gage length of 80 mm with a layer thickness of S<3 mm, of greater than or equal to 10%, preferably greater than or equal to 15%, particularly preferably greater than or equal to 20%. The less ductile middle layer preferably has an elongation at break Aso of less than 20%, particularly preferably less than 15%.

In the case of the hot forming of the semifinished product produced from the material composite, diffusion processes take place which result in mixing of the individual layers of the material composite. For example, carbon can diffuse from a layer which has a higher carbon content into a layer which has a lower carbon content. As a result of these diffusion processes, a material can be formed during hot forming which has smoothly changing material properties over the thickness.

Finally, the object is also achieved by the use of a flexibly rolled material composite in a vehicle structure. The flexibly rolled material composite has locally different material thicknesses, with the result that the weight of the vehicle structure is reduced. The flexibly rolled material composite can be used in particular in a B pillar, a side member and/or a crash box.

Further details, features and advantages of the invention can be gathered from the drawings, and from the following description of preferred embodiments with reference to the drawings. The drawings illustrate in this case only exemplary embodiments of the invention which do not limit the concept of the invention.

Figure 1:
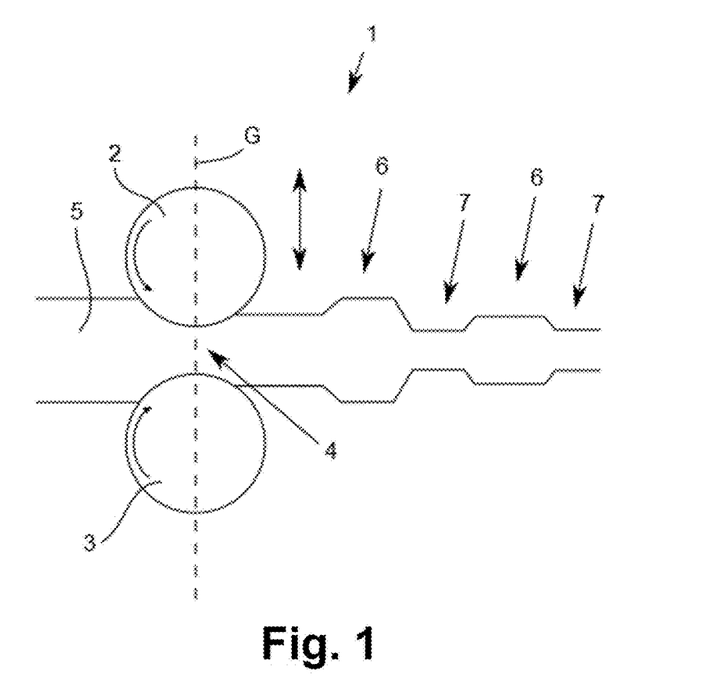
FIG. 1 is a schematic sectional view of an apparatus for flexible rolling.

FIG. 1 illustrates by way of example an apparatus 1 for flexible rolling in which the method according to the invention can be realized. The apparatus comprises two rollers 2, 3 between which a rolling gap 4 is formed. A first roller 3 is formed in a stationary manner, while a second roller 4 is movable linearly on a straight line G connecting the axes of rotation of the two rollers 3, 4. Via the movement of the second roller 4, the rolling gap 4 can be set. Thus, by means of the apparatus 1, the degree of rolling can be set, in particular continuously.

A multilayer, metal material composite 5, which comprises a plurality of layers with different ductilities, is fed to the rolling gap 4. If the rolling gap 4 is increased in size, regions 6 with a greater material thickness are created in the rolled material composite. By contrast, if the rolling gap 4 is reduced in size, regions 7 with a smaller material thickness are created in the rolled material composite.

The apparatus 1 allows both flexible rolling at room temperature (cold rolling) and flexible rolling at increased temperature (hot rolling). To this end, the material composite can be heated to a temperature above the austenitizing temperature of the layers of the material composite, for example to a temperature in the range from 700° C. to 1300° C., preferably in the range from 880° C. to 920° C., particularly preferably to 900° C., and then rolled.

Figure 2:
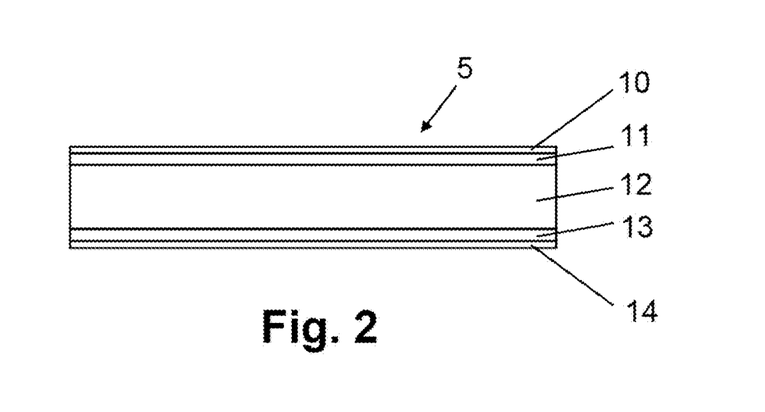
FIG. 2 is a schematic sectional view of a multilayer, metal material composite.

FIG. 2 shows a schematic sectional illustration of a strand-form, in particular strip-form, material composite 5. The material composite 5 comprises a middle layer 12. On a first side of the middle layer 12, a first outer layer 11 is arranged, and on a second side of the middle layer 12 on the opposite side from the first side, a second outer layer 13 is arranged. Coatings 10, 14 are provided on the outer sides of the outer layers which are on the opposite side from the middle layer 12. Thus, the material composite 5 has a symmetrical structure with regard to the middle layer 12. The materials of the outer layers 11, 13 are selected such that they consist of an identical steel material. The middle layer 12 is made of a steel material different than the outer layers 11, 13. The steel materials of the middle layer 12 and of the outer layers 11, 13 are selected such that the outer layers 11, 13 have a higher ductility and lower degree of hardening than the middle layer 12. In addition, the outer layers 11, 13 have a lower hardening capacity than the middle layer 12.

Figure 3:
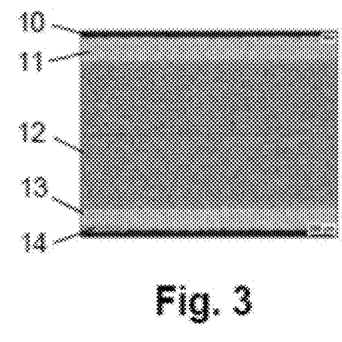
FIG. 3 is a sectional view of a first material composite.

FIG. 3 shows a section through a first exemplary embodiment of a material composite 5.1. The material composite 5.1 comprises a middle layer 12 made of a steel material with the following composition, which will be denoted material A1 in the following text:
Carbon: 0.20 to 0.27% by weight;
Silicon: 0.15 to 0.35% by weight;
Manganese: 1.10 to 1.40% by weight;
Aluminum: 0.015 to 0.060% by weight;
Chromium: 0.05 to 0.25% by weight;
Titanium: 0.015 to 0.040% by weight;
Boron: 0.0015 to 0.0040% by weight;
Phosphorus: ≤0.025% by weight;
Sulfur: ≤0.004% by weight;
Copper: ≤0.15% by weight;
Molybdenum: ≤0.10% by weight;
Nitrogen: ≤0.01% by weight
Nickel: ≤0.15% by weight;
Niobium: ≤0.006% by weight;
Vanadium: ≤0.01% by weight;
Tin: ≤0.03% by weight;
Calcium: ≤0.0050% by weight;
Arsenic: ≤0.01% by weight;
Cobalt: ≤0.01% by weight.

Figure 11:
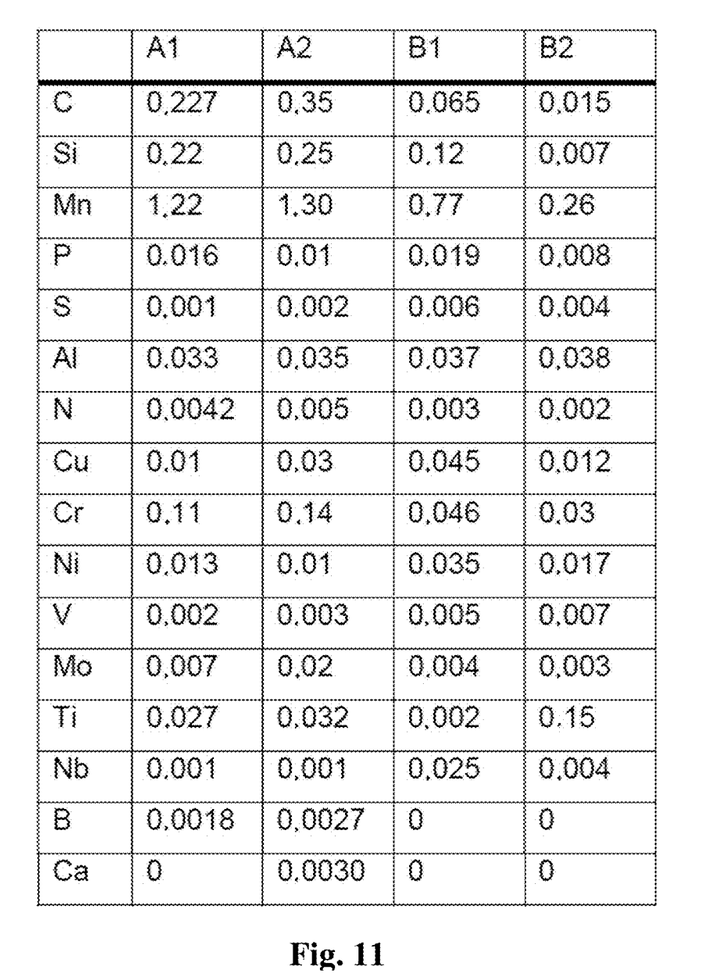
FIG. 11 is a table displaying measurement data from a chemical analysis of a material A1 in percent by weight.

Measurement data from a chemical analysis of the material A1 in % by weight can be found in the table in FIG. 11.

Alternatively, the middle layer 12 can be made from a steel material with the following composition, which is denoted material A2 in the following text:
Carbon: 0.30 to 0.50% by weight;
Silicon: 0.10 to 0.35% by weight;
Manganese: 1.10 to 1.50% by weight;
Aluminum: 0.015 to 0.060% by weight;
Chromium: 0.05 to 0.45% by weight;
Titanium: 0.015 to 0.045% by weight;
Boron: 0.0015 to 0.0045% by weight;
Phosphorus: ≤0.025% by weight;
Sulfur: ≤0.004% by weight;
Copper: ≤0.15% by weight;
Molybdenum: ≤0.1% by weight;
Nitrogen: ≤0.01% by weight
Nickel: ≤0.1% by weight;
Niobium: ≤0.006% by weight;
Vanadium: ≤0.01% by weight;
Tin: ≤0.03% by weight;
Calcium: 0.0010 to 0.0050% by weight;
Arsenic: ≤0.01% by weight;
Cobalt: ≤0.01% by weight.

Measurement data from a chemical analysis of the material A2 in % by weight can be found in the table in FIG. 11.

The outer layers 11, 13 of the material composite 5.1 shown in FIG. 3 are made from a steel material with the composition described below. This is denoted material B1.
Carbon: 0.055 to 0.085% by weight;
Silicon: 0.12 to 0.29% by weight;
Manganese: 0.70 to 0.90% by weight;
Aluminum: 0.020 to 0.060% by weight;
Chromium: ≤0.20% by weight;
Titanium: ≤0.01% by weight;
Phosphorus: 0.010 to 0.030% by weight;
Sulfur: ≤0.012% by weight;
Copper: ≤0.20% by weight;
Molybdenum: ≤0.045% by weight;
Nitrogen: ≤0.01% by weight
Nickel: ≤0.20% by weight;
Niobium: 0.010 to 0.030% by weight;

Measurement data from a chemical analysis of the material B1 in % by weight can be found in the table in FIG. 11.

Alternatively, the outer layers 11, 13 can be made from a steel material with the following composition, which is denoted material B2 in the following text:
Carbon: 0.01 to 0.06% by weight;
Silicon: 0.10% by weight;
Manganese: 0.02 to 0.35% by weight;
Aluminum: 0.015 to 0.065% by weight;
Chromium: 0.10% by weight;
Titanium: 0.003 to 0.25% by weight;
Boron: 0.0004% by weight;
Phosphorus: 0.020% by weight;
Sulfur: 0.020% by weight;
Copper: 0.10% by weight;
Molybdenum: 0.025% by weight;
Nitrogen: 0.01% by weight
Nickel: 0.15% by weight;
Niobium: 0.006% by weight;
Tin: 0.015% by weight;

Measurement data from a chemical analysis of the material B2 in % by weight can be found in the table in FIG. 11.

In the material composite 5.1 shown in FIG. 3, the outer layers 11, 13 made of the material B1 have a thickness which exhibits in each case about 10% of the total thickness of the material composite 5.1. The thickness of the middle layer 12 made of the material A1 is about 80% of the total thickness of the material composite 5.1. Provided on each surface of the outer layers 11, 13 is a coating 10, 14, which has a thickness which is less than 1% of the total thickness of the material composite 5.1. The coatings 10, 14 are aluminum-silicon coatings.

Figure 4:
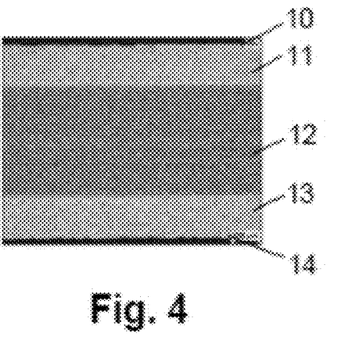
FIG. 4 is a sectional view of a second material composite.

FIG. 4 shows a second exemplary embodiment of a material composite 5.2. In this material composite 5.2, the middle layer 12 is likewise formed from the material A1 and the outer layers 11, 13 are formed from the material B1. The outer layers 11, 13 each have a thickness of about 20% of the total thickness of the material composite 5.2, and the middle layer 12 has a thickness of about 60% of the total thickness of the material composite 5.2. Provided on each surface of the outer layers 11, 13 is a coating 10, 14, which has a thickness which is less than 1% of the total thickness of the material composite 5.2. The coatings 10, 14 are aluminum-silicon coatings.

Figure 5:
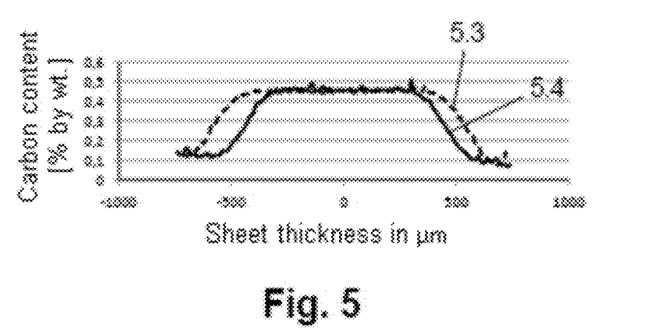
FIG. 5 is a profile view of the carbon content over the cross section of a material composite.

FIG. 5 illustrates the carbon content of a material composite 5.3 which comprises a middle layer 12 made of the material A2 and outer layers 11, 13 made of the material B1. The outer layers 11, 13 each have a thickness of about 10% of the total thickness of the material composite 5.3. Furthermore, the carbon content of a material composite 5.4 which comprises a middle layer 12 made of the material A2 and outer layers 11, 13 made of the material B1 is shown. The outer layers 11, 13 of the material composite 5.4 each have a thickness of about 20% of the total thickness of the material composite 5.4. The carbon content is plotted over the material thickness, wherein the axis of symmetry, extending through the middle layer 12, of the material composite 5.3, 5.4 is at the sheet thickness of 0 µm. It can be seen that the carbon content in the middle layer 12 has a maximum and decreases continuously in the transition regions from the middle layer 12 to the outer layers 11, 13. In the outer layers 11, 13, the carbon content reaches a minimum. In this respect, the carbon content in the outer layers 11, 13 is less than in the middle layer. In each particular material composite 5.3, 5.4, diffusion processes during the production and processing thereof have the result that the individual elements of each particular steel material diffuse from those regions which have a higher concentration of each particular element into those regions which have a lower concentration. For this reason, the material composites 5.3, 5.4 in the outer layers 11, 13 have a concentration of carbon which is increased compared with the material B1 used to form each particular outer layer 11, 13.

Figure 6:
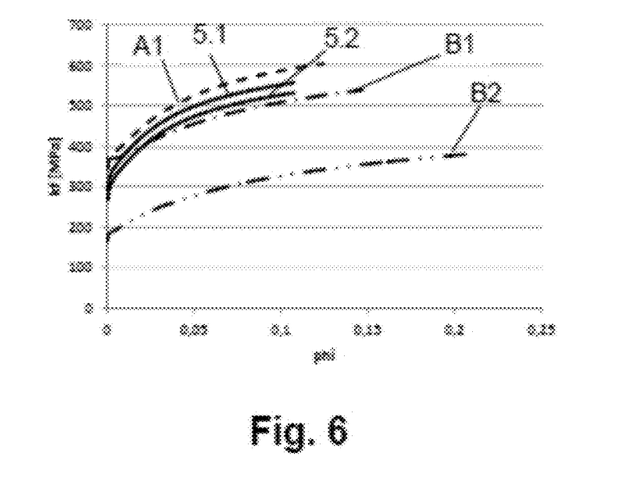
FIG. 6 is a view of the flow curves of different layers of a material composite and of a material composite.

FIG. 6 shows flow curves for the "harder" material A1 used for the middle layer 11 and for the "softer" materials B1 and B2 used for the outer layers 11, 13. Furthermore, flow curves of the material composite 5.1 according to FIG. 3 and of the material composite 5.2 according to FIG. 4 are given. The flow curves were taken at a strain rate of 0.004 1/s to SEP 1220. It can be seen that the flow stress kf of the material A1 of the middle layer 12 is greater than the flow stress kf of the material B1, B2 of the outer layers 11, 13, in particular in a range of the degree of forming phi of 0 to 0.1. The flow stress kf of the material B1, B2 of the outer layers 11, 13 is in a range of less than 550 MPa at a degree of forming phi in the range from 0 to 0.15. The flow stress kf of the material A1 of the middle layer has, at a degree of forming phi of 0.05 to 0.15, a flow stress kf of greater than 500 MPa.

Figure 7:
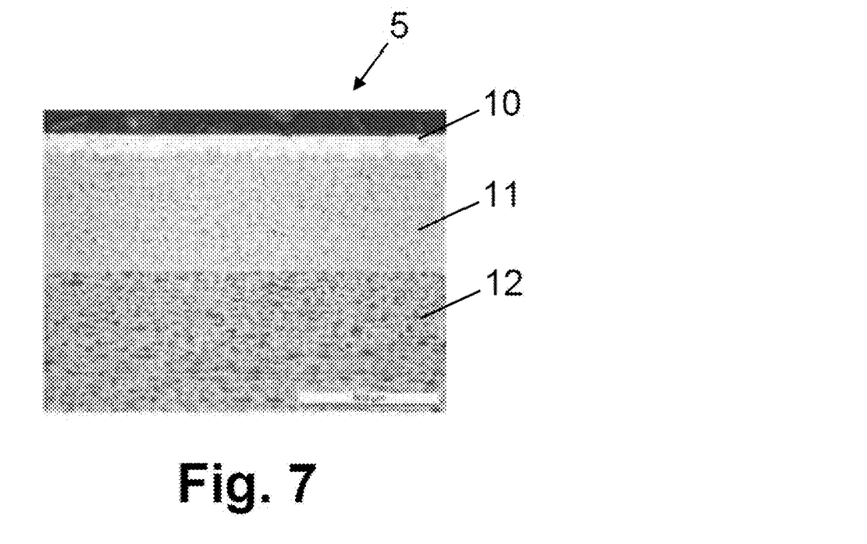
FIG. 7 is a sectional view of a multilayer, metal material composite after cold rolling.

FIG. 7 shows the layer structure of a material composite 5 processed by flexible rolling at room temperature by means of an apparatus 1 according to FIG. 1. The degree of rolling was 50% in the portion shown. It can clearly be seen that the layer structure of the material composite 5 has been retained. In particular, the individual layers of the material composite 5 were not separated from one another.

Furthermore, the relative ratio of the thicknesses of the individual layers 10, 11, 12, 13, 14 of the material composite 5 is retained during flexible rolling. Therefore, thicker regions and thinner regions of the material composite 5, which have an identical relative layer thickness distribution, can be produced.

Figure 8:
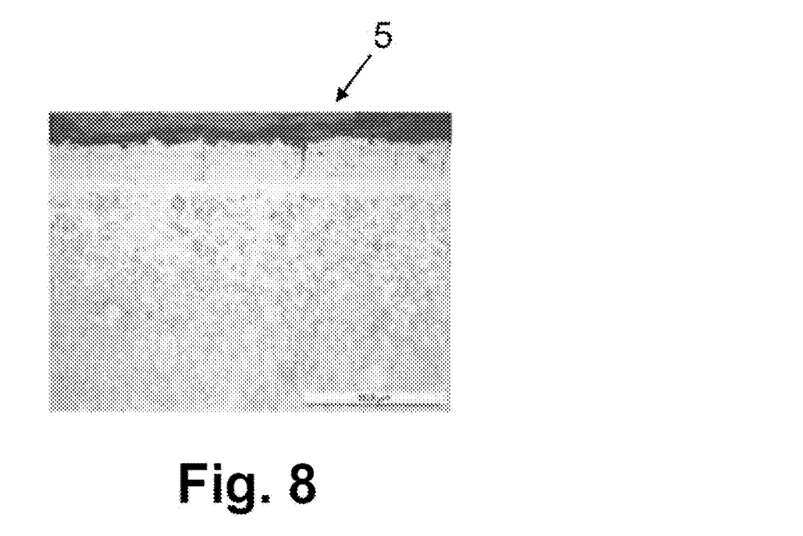
FIG. 8 is a sectional view of the material composite from FIG. 7 after hot forming.

FIG. 8 shows a corresponding region of the material composite 5 from FIG. 7 after a subsequent heating step for hot forming, in particular during press hardening. As a result of the heating above the austenitizing temperature, diffusion processes for example of the carbon are accelerated, with the result that mixing of the individual layers occurs. In addition, the constituents of the coating 10 are mixed with the outer layers 11, 13 adjoining the coating. On account of the mixing, homogenization of the material properties in the cross-sectional direction of the material composite 5 occurs.

Figure 9:
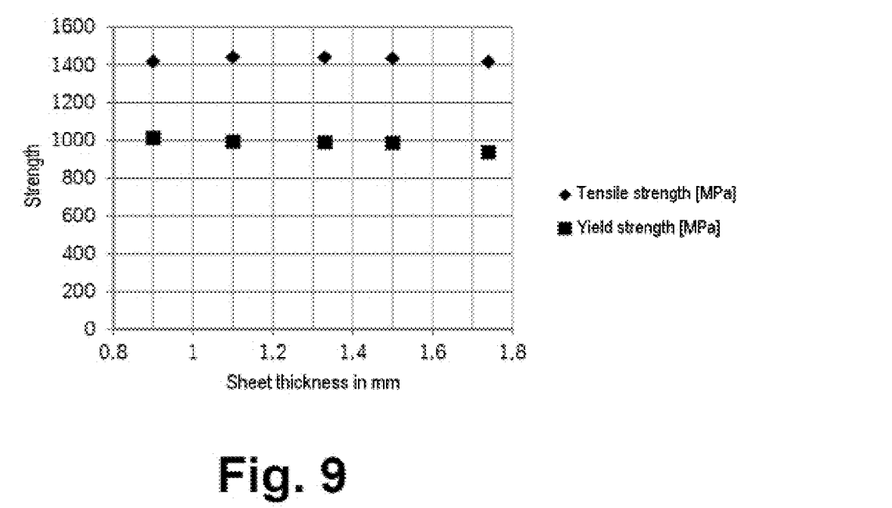
FIG. 9 is a view of the tensile strength and the yield strength of the material composite after hot forming for different material thicknesses.
Figure 10:
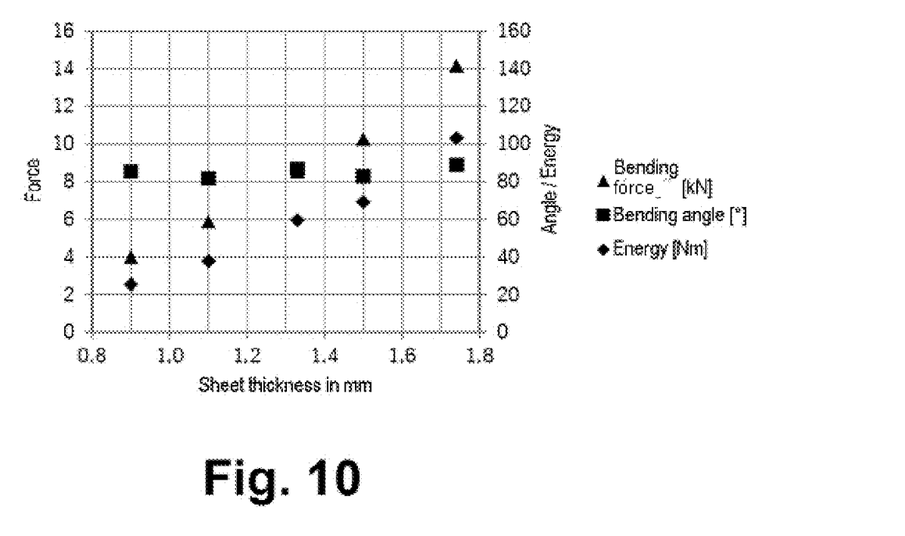
FIG. 10 is a view of the bending force, the bending angle and the energy of the material composite after hot forming for different material thicknesses.

FIG. 9 shows the tensile strength and the yield strength for regions with different material thicknesses. In FIG. 10, the bending force, the bending angle and the energy, likewise for different material thicknesses, are plotted. The measurement of the strength and of the bending angle for regions of the produced structural component with different material thicknesses yielded virtually constant values for material thicknesses in the range from 0.8 mm to 1.8 mm. It was thus found that both regions of the material composite 5 with a smaller material thickness and regions with a greater material thickness have a virtually identical hardening behavior, this being attributable to the identical relative layer thickness distribution in these regions. In this respect, it is not possible to establish any dependence of the material properties, in particular of the strength and of the bending angle, in the material composite 5, in contrast to monolithic materials. On account of this hardening behavior which is independent of the material thickness, the maximum producible residual ductility of the material composite 5 is not limited by the minimum material thickness, and so greater thickness differences can be set during flexible rolling. Therefore, the weight of the structural components produced can be reduced further.

LIST OF REFERENCE SIGNS

1 Apparatus for flexible rolling
2 Roller
3 Roller
4 Rolling gap
5 Material composite
5.1 Material composite
5.2 Material composite
5.3 Material composite
5.4 Material composite
6 Thick region
7 Thin region
10 Coating
11 Outer layer
12 Middle layer
13 Outer layer
14 Coating
A1, A2 Material of the middle layer
B1, B2 Material of the outer layers
G Straight line

What is claimed is:

1. A method for producing a semifinished product with locally different material thicknesses, the method comprising:
preparing a multilayer, metal material composite, wherein the multilayer, metal material composite has a plurality of layers with different ductilities; and
rolling the multilayer, metal material composite by way of a method for flexible rolling through a rolling gap formed between two rollers, wherein the rolling gap is configured such that regions with different material thicknesses are formed in the multilayer, metal material composite.

2. The method of claim 1 wherein the multilayer, metal material composite is rolled at room temperature.

3. The method of claim 1 wherein the multilayer, metal material composite is rolled at a temperature above an austenitizing temperature of the plurality of layers.

4. The method of claim 1 wherein the multilayer, metal material composite is rolled at a temperature in a range from 700° C. to 1300° C.

5. The method of claim 1 wherein the plurality of layers of the multilayer, metal material composite comprises a first outer layer disposed on a first side of a middle layer and a second outer layer disposed on a second side of the middle layer, the second side of the middle layer being opposite the first side.

6. The method of claim 5 wherein a coating is disposed on a side of the first outer layer that is opposite the middle layer.

7. The method of claim 5 wherein the multilayer, metal material composite has a symmetrical layer structure with respect to the middle layer.

8. The method of claim 5 wherein the first and second outer layers have a higher ductility than the middle layer.

9. The method of claim 5 wherein the middle layer, the first outer layer, and the second outer layer are comprised of a carbon-containing steel, wherein a carbon content in the first and second outer layers is lower than in the middle layer.

10. The method of claim 5 wherein the middle layer, the first outer layer, and the second outer layer are comprised of a manganese-containing steel, wherein a manganese content in the first and second outer layers is lower than in the middle layer.

11. The method of claim 5 wherein the middle layer, the first outer layer, and the second outer layer are comprised of a silicon-containing steel, wherein a silicon content in the first and second outer layers is lower than or equal to a silicon content in the middle layer.

12. The method of claim 5 wherein the middle layer, the first outer layer, and the second outer layer are comprised of a chromium-containing steel, wherein a chromium content in the first and second outer layers is lower than or equal to a chromium content in the middle layer.

13. The method of claim 5 wherein the middle layer, the first outer layer, and the second outer layer are comprised of at least one of a carbon-containing steel, a manganese-containing steel, a silicon-containing steel, or a chromium-containing steel, wherein a sum of a carbon content, a manganese content, a silicon content, and a chromium content in the first and second outer layers is less than a sum of a carbon content, a manganese content, a silicon content, and a chromium content in the middle layer.

14. The method of claim 5 wherein a thickness of the first and second outer layers is in a range of 5% to 40% of a total thickness of the multilayer, metal material composite.

15. A method for producing a structural component with locally different material thicknesses, the method comprising:
preparing a semifinished product, wherein the semifinished product has a plurality of layers with different ductilities; and
rolling the semifinished product by way of a method for flexible rolling through a rolling gap formed between two rollers, wherein the rolling gap is configured such that regions with different material thicknesses are formed in the semifinished product,
wherein the semifinished product is formed in a hot state to obtain the structural component.

16. A semifinished product with locally different material thicknesses, the semifinished product comprising a plurality of layers with different ductilities, wherein the plurality of layers comprises a first outer layer disposed on a first side of a middle layer and a second outer layer disposed on a second side of the middle layer, the second side of the middle layer being opposite the first side, wherein the plurality of layers has a symmetrical layer structure with respect to the middle layer, wherein the first and second outer layers have a higher ductility than the middle layer.

17. The semifinished product of claim 16 comprising a coating disposed on a side of the first outer layer that is opposite the middle layer.

18. The semifinished product of claim 16 wherein a thickness of the first and second outer layers is in a range of 5% to 40% of a total thickness of the semifinished product.

19. The semifinished product of claim 16 wherein the middle layer, the first outer layer, and the second outer layer are comprised of at least one of a carbon-containing steel, a manganese-containing steel, a silicon-containing steel, or a chromium-containing steel, wherein a sum of a carbon content, a manganese content, a silicon content, and a chromium content in the first and second outer layers is less than a sum of a carbon content, a manganese content, a silicon content, and a chromium content in the middle layer.

* * * * *